April 2, 1968
E. L. LEBAN
3,375,923
COMBINATION ARTICLE STORAGE AND SORTING DEVICE
Filed Sept. 27, 1966
5 Sheets-Sheet 1
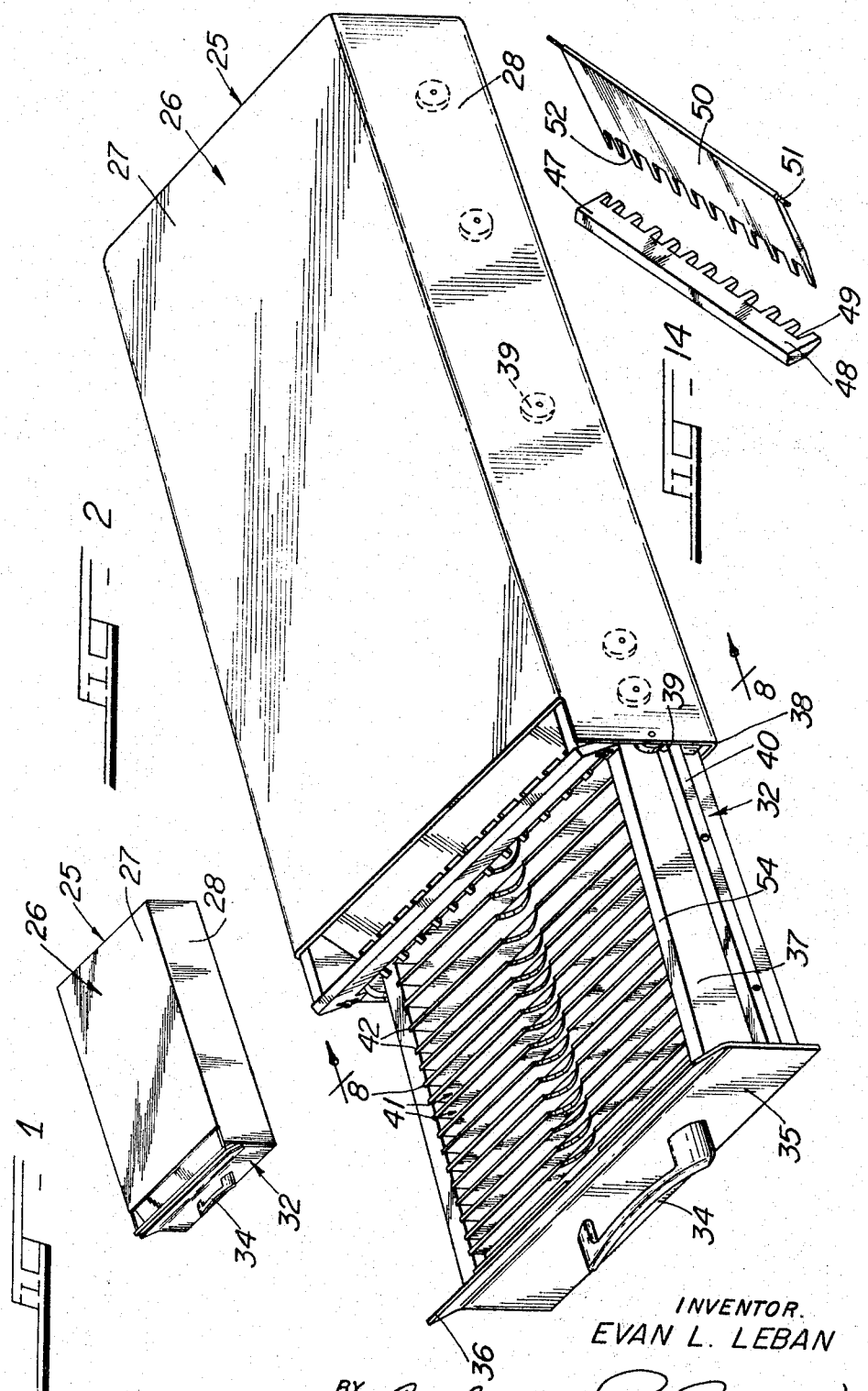
INVENTOR.
EVAN L. LEBAN
BY Charles B. Cannon
ATTY.

April 2, 1968　　　　　　E. L. LEBAN　　　　　　3,375,923
COMBINATION ARTICLE STORAGE AND SORTING DEVICE
Filed Sept. 27, 1966　　　　　　　　　　　　5 Sheets-Sheet 2
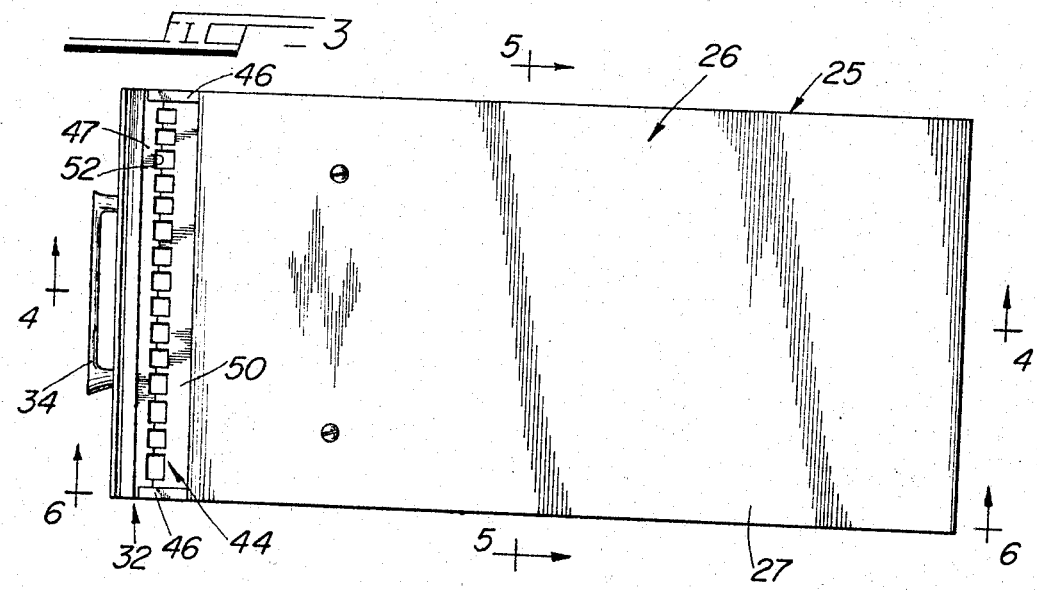
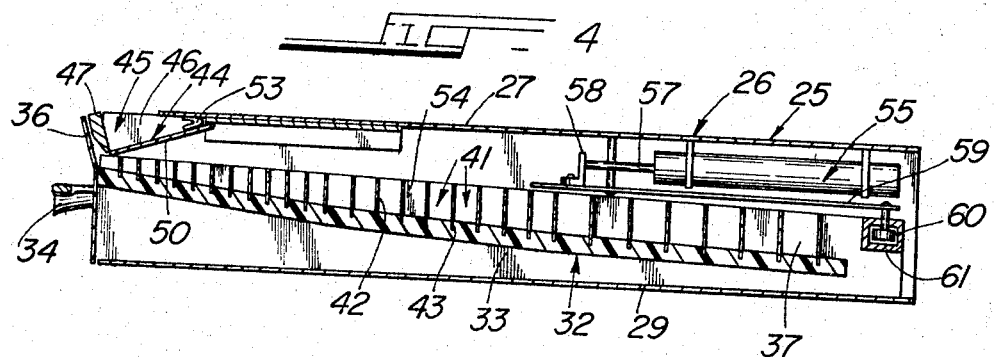
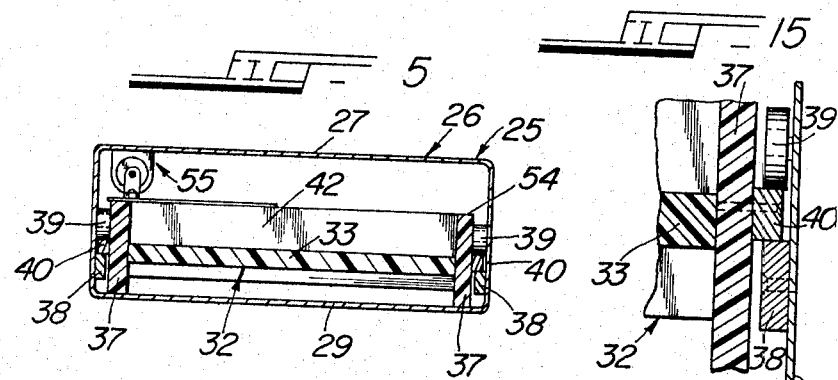
INVENTOR.
EVAN L. LEBAN
BY Charles B. Cannon
ATTY.

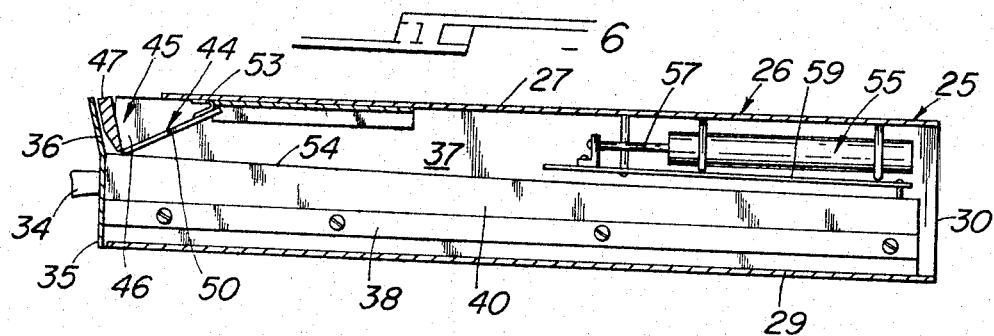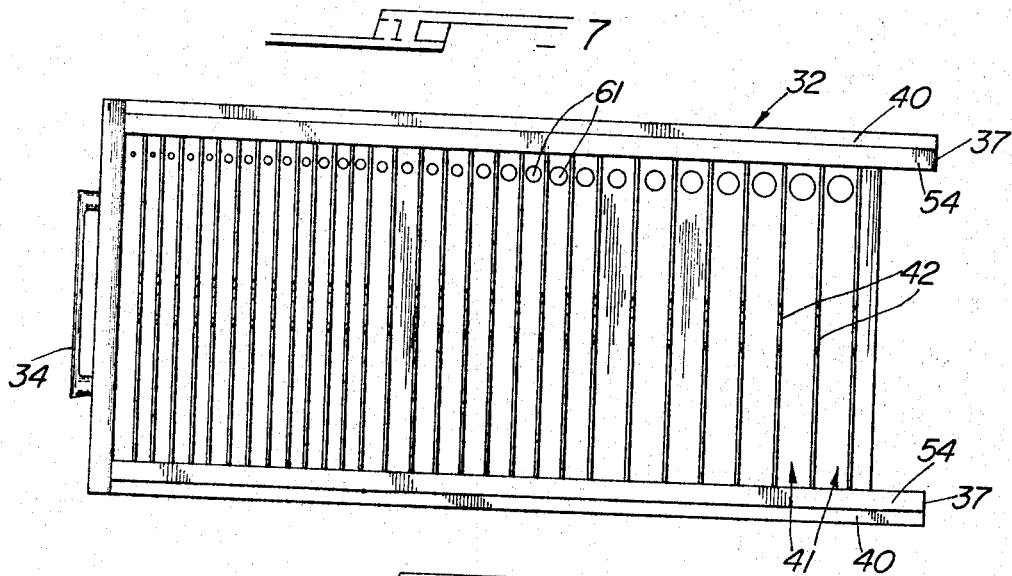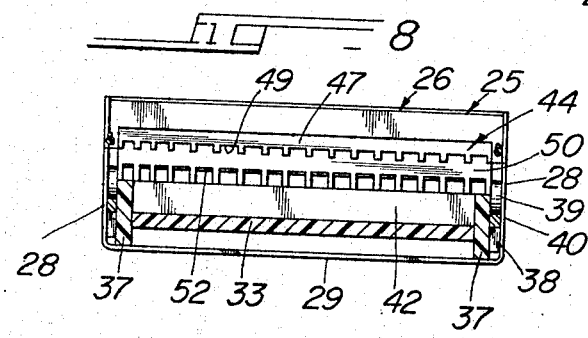

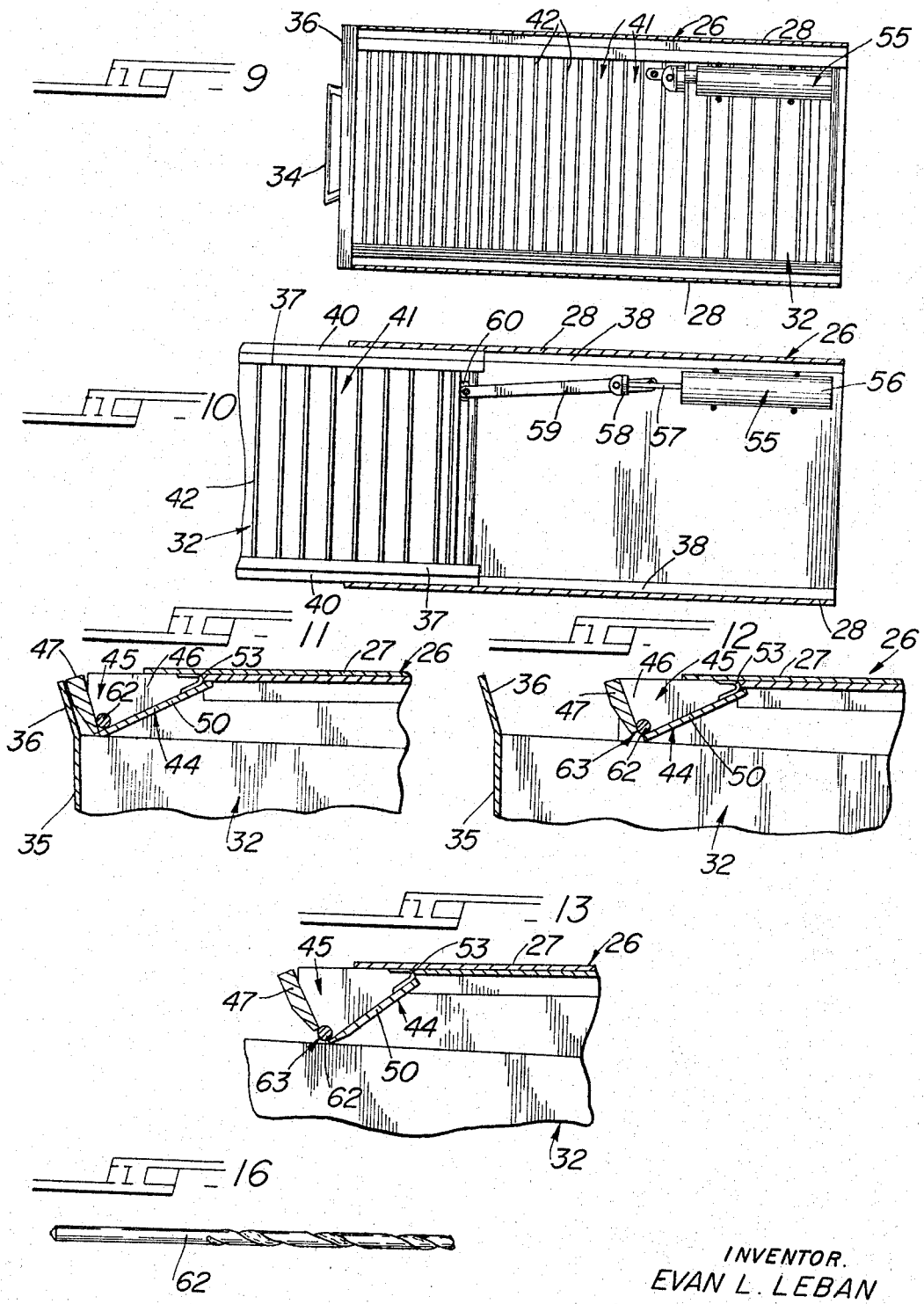

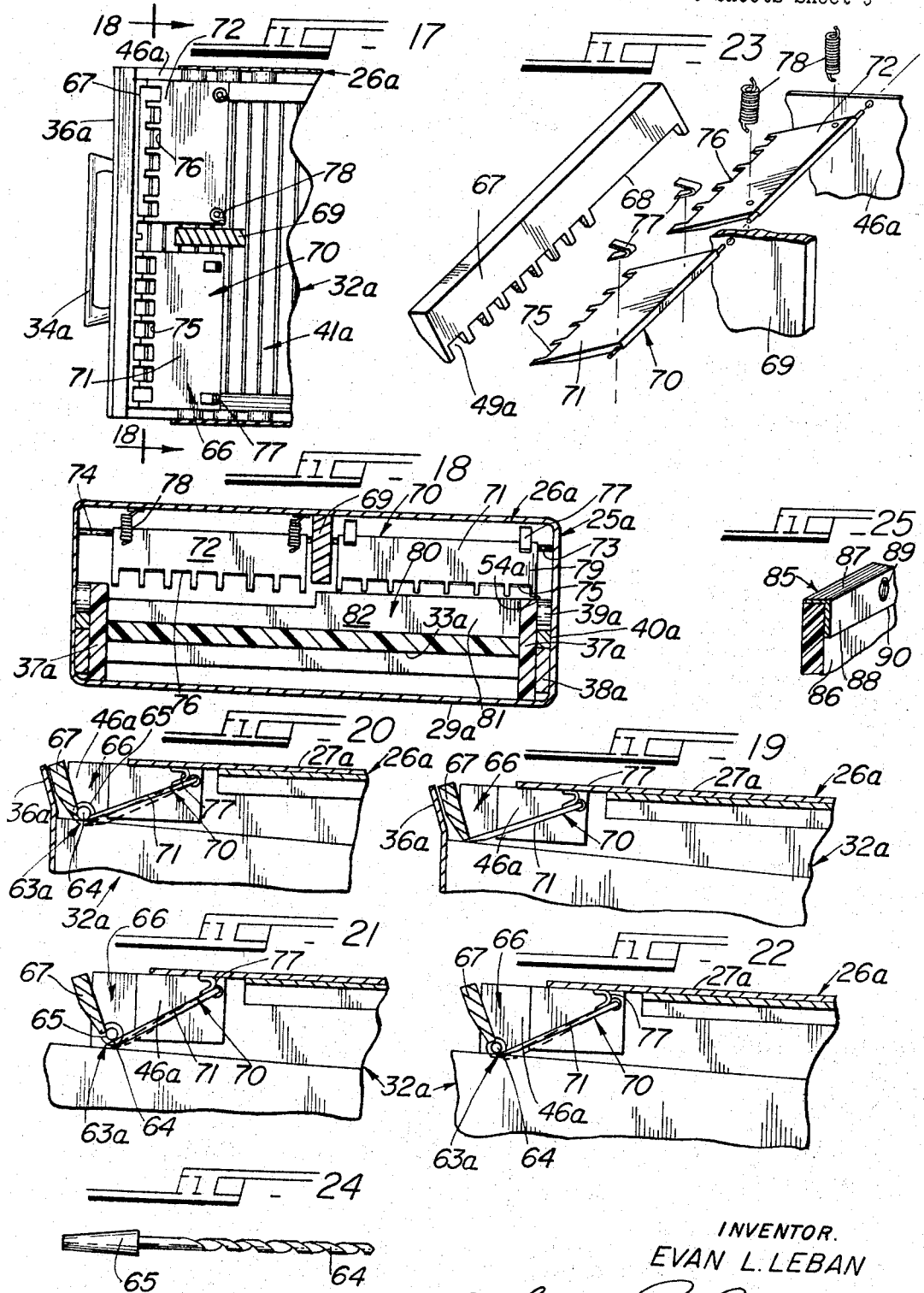

United States Patent Office 3,375,923
Patented Apr. 2, 1968

3,375,923
COMBINATION ARTICLE STORAGE
AND SORTING DEVICE
Evan L. Leban, 28 W. 281 Buena Vista Drive,
Glen Ellyn, Ill. 60137
Filed Sept. 27, 1966, Ser. No. 582,384
15 Claims. (Cl. 209—97)

This invention relates to a combination article storage and sorting device.

More particularly, this invention relates to a combination storage and sorting device for small tool parts such, for example, as drill bits.

Heretofore in the use of drill bits it has been common practice for the workman or mechanic to file the drill bits in a tool box, or like place, where they would become mixed with other tool bits of various sizes and shapes, and selecting a particular drill bit for use, under these conditions, has been a laborious and time-consuming operation.

An object of the present invention, therefore, is to provide a novel combination article storage and sorting device for small articles such, for example, as drill bits, and the like, and in the use of which articles, such as drill bits, may be automatically sorted and fed into their proper storage compartments in a storage drawer which is embodied in the combination article storage and sorting device.

Another object of the invention is to provide a new combination article storage and sorting device which embodies novel means for sorting small articles, such as drill bits, dowel pins, and the like, and for feeding them into their proper storage compartments in a storage drawer which is embodied in the device.

A further object of the invention is to provide a novel combination article storage and sorting drawer unit which is embodied in and as a part of the new article storage and sorting device.

An additional object of the invention is to provide in the new combination article storage and sorting device a novel article-receiving hopper and sorting gate mechanism therefor for sorting articles in the hopper and discharging them selectively into their proper compartments in the combination article storage and sorting drawer unit.

An additional object of the invention is to provide in one form thereof a combination storage and sorting device for sorting drill bits including drill bits which may have burrs or other rough surfaces thereon.

Still another object of the invention is to provide, in one form thereof, a combination drill bit storage and sorting device embodying novel means for sorting drill bits which have a shank portion which is larger than the body of the drill bit.

A further object of the invention is to provide, in one form thereof, a novel construction for adjusting the angular inclination of a cam track member embodied in the apparatus relative to the hinged sorting gate member and the extent of downward movement of the hinged sorting gate member as the combination storage and sorting drawer unit is withdrawn from its housing.

Other objects will appear hereinafter.

In the drawings:

FIG. 1 is a perspective view of a typical embodiment of the new combination article storage and sorting device showing the combination storage and sorting drawer unit in closed position;

FIG. 2 is an enlarged perspective view of a typical embodiment of the new combination article storage and sorting device, as shown in FIG. 1, but showing the storage and sorting drawer partially removed from its housing;

FIG. 3 is a top plan view of the combination article storage and sorting device shown in FIGS. 1 and 2 with the storage and sorting drawer unit in closed position;

FIG. 4 is a longitudinal vertical sectional view on line 4—4 in FIG. 3;

FIG. 5 is a transverse vertical sectional view on line 5—5 in FIG. 3;

FIG. 6 is a longitudinal vertical sectional view on line 6—6 in FIG. 3;

FIG. 7 is a top plan view of the combination article storage and sorting drawer unit shown in FIGS. 1 to 6, inclusive;

FIG. 8 is a transverse sectional view on line 8—8 in FIG. 2;

FIG. 9 is a top sectional plan view showing the combination article storage and sorting drawer unit in its housing;

FIG. 10 is a view similar to FIG. 9 but showing the combination article storage and sorting drawer unit partially withdrawn from its housing;

FIG. 11 is a fragmentary sectional detail view showing parts of the article-receiving hopper and sorting gate mechanism associated therewith in their initial and closed position with the combination article storage and sorting drawer unit disposed fully within its housing;

FIG. 12 is a fragmentary sectional detail view showing the position of the parts of the sorting gate mechanism in the position which they assume when the combination article storage and sorting drawer unit is partially withdrawn from its housing;

FIG. 13 is a fragmentary sectional detail view, similar to FIGS. 11 and 12, but showing the position of the parts of the sorting gate mechanism when the combination article storage and sorting drawer unit is withdrawn from its housing a distance sufficient to discharge a drill bit into its proper storage compartment in the combination storage and sorting drawer unit;

FIG. 14 is an exploded perspective view of parts of the sorting gate mechanism embodied in the form of the invention illustrated in FIGS. 1 to 13, inclusive;

FIG. 15 is a sectional detail view of part of the combination article storage and sorting drawer unit and the guide means therefore;

FIG. 16 is an elevational view of a typical drill bit such as that with which the form of the invention illustrated in FIGS. 1 to 15, inclusive, may be used;

FIG. 17 is a fragmentary sectional plan view illustrating a modification of the invention;

FIG. 18 is a transverse vertical sectional view on line 18—18 in FIG. 17;

FIG. 19 is a fragmentary sectional detail view of a part of the combination article storage and sorting drawer unit and sorting gate mechanism embodied in the form of the invention illustrated in FIGS. 18 to 24, inclusive;

FIG. 20 is a fragmentary sectional detail view similar to FIG. 19 but showing the parts of the sorting gate mechanism disposed in their initial position;

FIG. 21 is a fragmentary sectional detail view showing the parts of the sorting gate mechanism in the position which they assume as an article is being prepared for discharge into its proper storage compartment in the combination article storage and sorting drawer unit;

FIG. 22 is a fragmentary sectional detail view similar to FIG. 21 but showing the parts of the sorting gate mechanism in the position which they assume as an article is being discharged into its proper storage compartment;

FIG. 23 is an exploded perspective view of the sorting gate mechanism embodied in the form of the invention illustrated in FIGS. 18 to 22, inclusive;

FIG. 24 is an elevational view of a drill bit and shank of the type with which the form of the invention illustrated in FIGS. 18 to 23, inclusive, is particularly useful; and FIG. 25 is a fragmentary perspective view of a modified form of the cam trackway embodied in the invention.

A preferred embodiment of the new combination article and sorting device is illustrated in FIGS. 1 to 15, inclusive, wherein it is generally indicated at 25, and comprises an elongated generally rectangular-shaped housing 26 which includes a top wall 27, side walls 28, a bottom wall 29, an open rear end 30, and an open front end 31. Slidably mounted within the housing 26 is a combination article storage and sorting drawer unit 32 which includes an inclined bottom wall 33 which is tapered upwardly from its lower inner or rear end to its front and upper end, as shown in FIG. 4. The combination article storage and sorting drawer unit 32 includes a front wall 35 which has an outwardly and forwardly inclined upper end portion 36, and a handle 34 is mounted on the front wall 35. The combination article storage and sorting drawer unit 32 also includes inclined side walls 37 which are arranged at opposite sides of the inclined bottom wall 33 and these inclined side walls 33 are inclined downwardly from their front ends to their rear ends (FIG. 4). An inclined guide rail 38 is mounted on each side wall 28 of the housing 26, on the inner side thereof, and rollers 39 are also rotatably mounted on the inside of the side walls 28 of the housing 26 (FIGS. 5, 8 and 15). A longitudinally extending guide rail 40 is mounted on the outer surface of each of the inclined side walls 37 of the combination article storage and sorting drawer unit 32 and each of these guide rails 40 is slidably mounted between the adjacent fixed guide rail 38 and rollers 39 to enable the combination article storage and sorting drawer unit 32 to be slidably moved in and relative to the housing 26 while preventing up and down or vertical movement of the combination article storage and sorting drawer unit 32 in and relative to the housing 26, for a reason which will be pointed out hereinafter.

The combination article storage and sorting drawer unit 32 includes a plurality of article storage compartments or pockets 41 which are formed, in part, by the inclined bottom wall 33 and by spaced horizontally extending partitions 42 which are suitably mounted in slots 43 formed in the upper surface of the inclined bottom wall 33 of the combination article storage and sorting drawer 32 (FIG. 4) and in similar slots formed in the side walls 37 of the combination article storage and sorting drawer unit 32 (FIG. 2). The article storage compartments 41 are spaced longitudinally axially of the article storage and sorting drawer unit 32 and are open at their upper ends and are sized or dimensioned so that they vary gradually in width from front to rear so as to accommodate articles, such as drill bits, of varying and different sizes.

The new article storage and sorting device 25 includes a sorting gate mechanism which is generally indicated at 44, and which is associated with an article storage hopper 45. The article storage hopper 45 is formed, in part, by generally triangular-shaped end wall portions 46 which are attached to the side walls 28 of the housing 26 (FIG. 2) and, in part, by a stationary front end wall 47 which extends between and is attached to the end wall portions 46 at the outer or front surfaces thereof. This front wall 47 of the article storage hopper 45 is inclined forwardly from its lower end to its upper end so as to provide an inclined inner wall 48, which has a notched or serrated lower end portion 49 (FIGS. 2, 3, 8 and 14) for a reason which will be discussed hereinafter.

The article storage hopper 45 is also formed, in part, at its rear end or inner end, by a hinged gate member 50 which is hingedly mounted by a hinge pintle 51 (FIG. 14) in the end wall portions 46 of the hopper 45. This hinged gate member 50 has a notched or serrated lower edge portion 52 and is urged by U-shaped spring members 53 into lowered position in which it coacts with the stationary front end wall 47 normally to close the lower end portion of the hopper 45 (FIGS. 4, 6 and 11).

As shown in FIGS. 4, 5, 11, 12 and 13, the upper surface of one of the side walls 37 of the combination article storage and sorting drawer unit 32 provides an inclined cam trackway surface 54 and the hinged gate member 50 is urged by the spring members 53 into a downward position so that the lower outer edge portions thereof ride on the cam trackway surface 54, for a reason which will be pointed out hereinafter.

A conventional dash pot device 55 is provided in the housing 26 and comprises a cylinder 56 which is suitably mounted in the housing 26 above the slidable article storage and sorting drawer unit 32 and has a piston 57 slidably mounted therein. The piston 57 is connected, by suitable linkage 58, to one arm 59 which is pivotally mounted at one end, as at 91, in the housing 26 and which works in a horizontally and transversely extending trackway 61 which is provided within the housing 26, at the rear thereof, as shown in FIGS. 4, 6 and 10.

Suitable drill bit test gauge holes or recesses 61 may be provided, if desired, in the bottom wall 33 of the combination article storage and sorting drawer unit 32, at one end of each of the storage compartments 41, for testing or gauging the size or diameter of the drill bits, as 62 (FIGS. 11, 12, 13 and 16) to be stored therein.

In the use of the form of the invention illustrated in FIGS. 1 to 15, inclusive, articles to be stored and sorted, such, for example, as small hand drill bits, may be inserted into the hopper 45 from the open upper end thereof whereupon, to effect the sorting operation, the slidable combination storage and sorting drawer unit 32 may then be manually pulled slowly from its housing by means of the handle 34. During this operation the slidable guide rails 40, which are attached to the side walls 37 of the slidable storage and sorting drawer unit 32, slide on the stationary guide rails 38 and between the latter and the rollers 39, and this arrangement of the slidable guide rails 40 between the stationary guide rails 38 and the rollers 39 prevents undesirable up and down or vertical motion of the combination storage and sorting drawer unit 32, which would interfere with the sorting operation of the sorting gate mechanism 44 and of the combination article storage and sorting drawer unit 32 associated therewith.

As the slidable combination storage and sorting drawer unit 32 is thus slowly withdrawn from the housing 26, the spring-urged hinged gate member 50 is urged downwardly by the springs 53 so that the lower end portion thereof engages and rides upon the upper cam trackway surface 54 of one of the inclined side walls 37 of the slidable storage and sorting drawer unit 32. During this operation, and as the combination storage and sorting drawer unit 32 is pulled slowly outwardly of the housing 26, the lower front end portion of the hinged gate member 50 moves downwardly away from the inner surface 48 of the relatively stationary front wall 47 of the hopper 45 from the position in which the parts are shown in FIGS. 4, 6 and 11 into the position in which the parts are shown in FIGS. 12 and 13 and eventually is moved a distance sufficient to provide a discharge throat or outlet passage 63 at the bottom of the hopper 45. The width of the discharge throat or outlet passage 63 at the bottom of the hopper 45 is directly dependent upon and is determined by the extent or linear distance which the combination storage and sorting drawer unit 32 has been pulled out of the housing 26 and the resulting and corresponding vertical distance which the lower end portion of the hinged gate member 50 moves as it travels down the inclined cam trackway surface 54 of one of the side walls 37 of the combination storage and sorting drawer 32.

Hence, when the front and lower end portion of the hinged gate member 50 has moved downwardly a sufficient distance to provide the discharge throat or outlet passage 63 in the lower end portion of the hopper 45 of a relatively small width or diameter, a relatively small article, such as a drill bit 63 of the corresponding diameter, will drop by gravity through the discharge throat or outlet 63 of the hopper 45 into the corresponding sized storage compartment or pocket 45 in the front or outer end portion of the combination storage and sorting drawer unit 32.

However, if there are additional drill bits 62 of varying sizes or diameter in the hopper 45 they will drop successively by gravity through the discharge throat or outlet 63 of the hopper 45 into the correspondingly sized or dimensioned storage compartments or pockets 41 in the combination storage and sorting drawer unit 32 as the latter is pulled further out of the housing 26 and the lower front end portion of the hinged gate member 50 rides down the upper cam trackway surface 54 of one of the inclined side walls 27 and thus gradually increases the width or diameter of the discharge throat or outlet 63 at the bottom of the hopper 45.

In this manner the drill bits 62, or like articles, are automatically sorted and dropped into their proper storage compartments 41 in the slidable storage and sorting drawer unit 32 as the latter is slowly pulled out of its housing 26. It will be noted, in this connection, that the width of the storage compartments or pockets 41 increases gradually from front to rear of the combination storage and sorting drawer unit 32 so that drill bits 62 of relatively smaller diameter are discharged through the discharge outlet or throat 63 of the hopper 45 into the relatively narrow storage compartments or pockets 41 at the start of the sorting operation and drill bits 62 of relatively larger diameter are discharged into the storage compartments or pockets 41 of relatively larger width as the combination storage and sorting drawer unit 32 is pulled further out of the housing 26 and the width of the discharge outlet or throat 63 of the hopper 45 is gradually increased by downward movement of the lower front end portion of the hinged gate member 50.

It will also be noted that the stationary inclined front wall 47 of the hopper 45 has a notched or serrated lower edge portion 49 and that the hinged gate member 50 has a notched or serrated lower edge portion 52. These serrated lower edge portions 49 and 52 of the inclined front end wall 47 and of the hinged gate member 50, respectively, facilitate the passage of the drill bits 62 one at a time, through the discharge throat or outlet 63 of the hopper 45 in instances in which a drill bit 62 may have burrs or like rough areas thereon which might otherwise become entangled in the inner surface 48 of the inclined front wall 47 or in the hinged gate member 50 of the hopper 45.

During the operation of slowly withdrawing the slidable storage and sorting drawer 32 from its housing 26 the dash pot device 55 regulates and prevents too rapid movement thereof which would interfere with the sorting operation. During this movement the arm 59 and linkage 58 act to withdraw the portion 57 from its cylinder 56, thereby causing the roller 60 to move laterally in the trackway 61 and thus control or regulate movement of the slidable storage and sorting drawer 32 during the sorting operation. However, after the sorting operation has been completed, the slidable storage and sorting drawer unit 32 may be slid back into the housing 26 and during this operation the roller 60 travels laterally in the opposite direction in the guideway 61 and the arm 59 and linkage 58 act to return the piston 57 back into the cylinder 56.

A modification of the invention is illustrated in FIGS. 17 to 24, inclusive, of the drawings, and in this form of the invention those parts thereof which are similar to or comparable to corresponding parts in the form of the invention shown in FIGS. 1 to 16, inclusive, have been given similar reference numerals followed by the additional and distinguishing reference character *a*.

The form of the invention shown in FIGS. 17 to 24, inclusive, is substantially similar to that shown in FIGS. 1 to 16, inclusive, but differs therefrom in that it is designed particularly for use with articles, such as drill bits 64, which have an enlarged shank portion 65, as shown in FIG. 24.

Thus, in order to accommodate drill bits 64 having an enlarged shank portion 65, the form of the invention illustrated in FIGS. 17 to 23, inclusive, provides an article storage hopper 66 and associated sorting gate mechanism therefor which differs somewhat from the hopper 45 and sorting gate mechanism 44 embodied in the form of the invention illustrated in FIGS. 1 to 16, inclusive.

Thus, the hopper 66 in the form of the invention illustrated in FIGS. 17 to 23, inclusive, is formed, in part, by end walls 46*a*, which are similar to the end walls 46 in the form of the invention illustrated in FIGS. 1 to 16, inclusive. However, the inclined front wall 67 of the hopper 66 differs from the inclined front wall 47 of the hopper 45 in the form of the invention illustrated in FIGS. 1 to 16, inclusive, in that while the inclined front wall 67 has a notched or serrated lower edge portion 49*a* throughout a part of its extent it has an uninterrupted surface 68 throughout the remaining lower edge portion thereof, as best shown in FIG. 23.

In addition, the hopper 66 is provided with a vertically extending transverse divider member 69 which is attached to and is carried by the top wall 27*a* of the housing 26*a*, and the sorting gate mechanism, which is generally indicated at 70, includes a primary sorting gate member 71 and an auxiliary sorting gate member 72 which are hingedly mounted, as at 73 and 74, respectively, in the end wall portions 46*a* and in the transverse divider member 69 of the hopper 66, as best shown in FIGS. 18 and 23. The primary sorting gate member 71 has notched or serrated lower edge portion 75 and the auxiliary sorting gate member 72 has a similar notched or lower edge portion 76 (FIGS. 18 and 23).

The primary sorting gate member 71 is urged downwardly by spring clip members 77 which are attached to the upper portion thereof and are carried by the top wall 27*a* of the housing 26*a*, whereas the auxiliary sorting member 72 is freely suspended on its pintle 74 and is merely urged into its normal upright position, as in FIG. 18, by a pair of coil spring members 78 which are attached at their lower ends to the auxiliary sorting gate member 72 and at their upper ends are attached to the top wall 27*a* of the housing 26*a*, as best shown in FIG. 18.

As shown in FIG. 18, the laterally outer edge portion 79 of the hinged gate member 71 rides upon the upper cam trackway surface 54*a* of one of the side walls 37*a* of the combination storage and sorting drawer 32*a*, whereas the laterally inner edge portion of the primary sorting gate members 71 is freely suspended adjacent the transverse divider member 69 (FIG. 18). However, neither of the laterally outer edge portions of the auxiliary sorting gate member 72 rides upon the upper cam trackway surface 54*a* of one of the side walls 37*a* of the combination storage and sorting drawer unit 32*a*; the auxiliary sorting gate member 72 being freely suspended between the transverse divider member 69*a* and the adjacent side wall 37*a* of the combination storage and sorting drawer unit 32*a*, as shown in FIG. 18.

In the form of the invention illustrated in FIGS. 17 to 23, inclusive, each of the transverse partition members 80, which are mounted on the upper surface of the bottom wall 33*a* of the combination storage and sorting drawer unit 32*a*, has a portion 81 of relatively larger height and an offset or reduced portion 82 of relatively lower height (FIG. 18), for a reason which will be pointed out presently.

In the use of the form of the invention illustrated in FIGS. 17 to 23, inclusive, articles such as drill bits 64 having an enlarged shank portion 65, may be placed in the hopper 66 for sorting into the storage compartments or pockets 41a and so that the body 64 of each drill bit rests on the primary sorting gate member 71 whereas the shank portion 72 thereof is disposed below the auxiliary gate member 72 and is unsupported except through the body portion of the drill bit 64–65. Accordingly, as the combination storage and sorting drawer unit 32a is slidably pulled out of its housing 26a, by means of the handle 34a, the laterally outer and lower edge portion 79 of the hinged gate member 71 is urged downwardly by the spring members 77 so that it rides on the upper cam trackway surface 54a of one of the side walls 37a of the combination storage and sorting drawer unit 32a. As the combination storage and sorting drawer unit 32a is gradually and manually pulled out of its housing 26a the discharge throat or outlet 63a at the bottom of the hopper 66 is enlarged or increased in diameter to a point sufficient to allow the body of the drill bit 64 to fall therethrough into its proper storage compartment or pocket 41a in the combination storage and sorting drawer unit 32a while, at the same time, the enlarged shank portion 65 of the drill bit 64 will fall through the discharge throat or outlet 63a below the auxiliary gate member 72 and between the latter and the upper surfaces 84 of the reduced portions 82 of the corresponding transverse partition members 80.

The front lower edge portion of the primary sorting gate member 71 is normally urged, by the spring clip members 77, into downward position so that the laterally outer edge portion 79 thereof will ride upon the upper cam trackway surface 54a of one of the side walls 37a, whereas the auxiliary gate member 72 is urged, by the coil springs 78, into its normally freely suspended vertical position, after each operation thereof.

A modification of one feature of the invention is illustrated in FIG. 25 of the drawings, and in this form of the invention the upper cam trackway surface of one of the side walls of the combination storage and sorting device is provided by auxiliary L-shaped cam track member 85 which is adjustably mounted on one of the side walls 86 of the combination article storage and sorting drawer unit. The auxiliary cam track member 85 includes an upper cam track surface 87 and a depending flange portion 88 which is adjustably mounted on the corresponding side wall 86 by means of screws 89 which project through elongated vertically extending slots 90 in the flange portions 88 into the said side wall 86. By means of this construction the cam track member 85 may be adjusted in and relative to the aforesaid side wall 86 of the storage and sorting drawer unit so as to vary the angular inclination of the cam track member 85 and the resulting extent of downward movement of the associated hinged sorting gate member as the storage and sorting drawer unit is withdrawn from its housing.

It will thus be noted that the present invention provides a new and improved combination article storage and sorting device for storing small articles, such as drill bits, for sorting them and returning them to their proper storage compartments after use with a minimum of time and effort required in the sorting operation.

It will thus be seen from the foregoing description, considered in conjunction with the accompanying drawings, that the present invention provides a new and improved combination article storage and sorting device for small articles, such as drill bits, having the desirable advantages and characteristics and accomplishing its intended objects, including those hereinbefore pointed out and others which are inherent in the invention.

I claim:
1. A combination article storage and sorting device comprising
 (1) a housing including
  (a) a top wall;
  (b) a bottom wall;
  (c) side walls; and having
  (d) an open front end portion;
 (2) a combination article storage and sorting drawer unit slidably mounted in the said housing; and including
  (a) a longitudinally extending cam trackway surface which is inclined from one end toward the other end thereof;
  (b) a series of article storage compartments of varying widths or sizes in the said combination article storage and sorting drawer unit and each being open at its upper end;
 (3) an article-receiving hopper carried by the said housing above the said article storage and sorting drawer unit and including
  (a) a hopper including a relatively stationary wall surface and which includes a relatively movable bottom wall surface in the form of a hinged sorting gate member having a lower edge portion which is adapted to ride upon the said inclined cam trackway surface and to move away from the said relatively stationary wall surface of the said hopper to provide
  (b) a discharge throat or outlet at the bottom of the said hopper; and
 (4) means normally urging the said lower edge portion of the said hinged gate member into lowered position and into engagement with the said inclined cam trackway surface,
 (5) whereby when the said combination article storage and sorting drawer unit is slidably moved out of the said housing through the said open end portion thereof the said lower portion of the said hinged sorting gate member moves away from the said relatively stationary wall surface of the said hopper to vary the width or diameter of the said discharge outlet or throat of the said hopper and to discharge articles of varying diameters from the said article-receiving hopper into the said article storage compartments or pockets in the said combination article storage and sorting drawer unit.

2. A combination article storage and sorting device as defined in claim 1 in which the said article-receiving hopper is arranged at the front of the said housing; and in which
 (a) a single cam trackway surface is located at one side thereof and is inclined gradually downwardly from its upper end adjacent the said article-receiving hopper to its lower end; and in which
 (b) the said end portion of the said hinged sorting gate member rides upon the said inclined cam trackway surface.

3. A combination article storage and sorting device as defined in claim 1 in which the said hinged sorting gate member has a notched or serrated lower edge portion.

4. A combination article storage and sorting device as defined in claim 1 in which the said article-receiving hopper includes an inclined front wall having a notched or serrated lower edge portion.

5. A combination article storage and sorting device as defined in claim 1 which includes
 (1) means slidably guiding the said combination article storage and sorting drawer unit for slidable movement in and relative to the said housing while preventing vertical up and down movement of the said combination article storage and sorting drawer unit during slidable movement thereof in and relative to the said housing.

6. A combination article storage and sorting device as defined in claim 1 in which the said article storage and sorting drawer unit includes
 (1) a front end portion; and
 (2) a rear end portion; and in which the said article storage and sorting drawer unit includes
 (3) an inclined bottom wall inclined downwardly from the front end of the said article storage and sorting drawer unit toward the lower end thereof; and in which the said storage and sorting drawer unit includes
(4) an inclined side wall inclined downwardly from its upper end toward its lower end and providing the said cam trackway surface; and in which
(5) the said article storage compartments are provided by partition members extending transversely between the said side walls and mounted on the said inclined bottom wall of the said combination storage and sorting drawer unit.

7. A combination article storage and sorting drawer unit as defined in claim 1 in which the said hopper is
(a) arranged at the front end portion of the said housing and is
(b) carried by the said top wall of the said housing at the front end portion thereof.

8. A combination article storage and sorting device comprising
(1) a housing;
(2) an article-receiving hopper disposed above the said housing and including a top and bottom;
(3) a combination article storage and sorting drawer unit slidably mounted on the said housing and including
(a) a plurality of article-storage compartments spaced longitudinally of and extending transversely of the said article storage and sorting drawer unit and each having an open upper end;
(4) an article sorting mechanism comprising
(a) sorting gate member movably mounted adjacent the bottom and normally closing the bottom of the said article-receiving hopper;
(5) said combination article storage and sorting drawer unit including
(a) an inclined trackway extending longitudinally thereof;
(6) means normally urging the said sorting gate member into engagement with the said inclined trackway as the said combination article-receiving and storage drawer unit is moved in and relative to the said housing so as to provide a discharge throat or outlet at the bottom of the said hopper and thereby discharge articles selectively from the said hopper into the said article storage compartments.

9. A combination article storage and sorting device as defined in claim 8 in which the said trackway is inclined downwardly from its upper end adjacent the said article-receiving hopper to its lower end.

10. A combination article-receiving and storage device as defined in claim 8 which includes a pair of the said trackways spaced laterally of the article storage and sorting drawer unit and inclined downwardly from their upper ends adjacent the said article-receiving hopper to their lower ends and in which the said sorting gate member is normally urged into engagement with both of the said trackways.

11. A combination article storage and sorting device as defined in claim 1 in which the said article-receiving hopper includes
(a) two compartments which are separated by a divider member, and in which the bottom wall of one of the said compartments is
(b) formed by the said hinged sorting gate member as a primary sorting gate member, and in which the bottom wall of the said other one of said compartments is formed by
(c) an auxiliary hinged sorting gate member.

12. A combination article storage and sorting device as defined in claim 1 in which the said primary sorting gate member includes
(a) a laterally outer edge portion riding upon the said inclined cam trackway surface, and in which
(b) the said auxiliary sorting gate member is freely suspended in the said housing above the said article storage compartments.

13. A combination article storage and sorting device as defined in claim 12 in which each of the said hinged gate members has a notched or serrated lower edge portion.

14. A combination article storage and sorting device as defined in claim 11 in which the said article storage compartments in the said storage and sorting drawer unit are provided by
(a) spaced transverse partition members each having a main body portion disposed below the said primary sorting gate member, and each having
(b) an offset portion of reduced height disposed below the said auxiliary sorting gate member.

15. A combination article storage and sorting device as defined in claim 1 in which the said combination storage and sorting drawer unit includes
(a) a side wall member having an auxiliary cam trackway member adjustably mounted on the upper surface thereof; and in which the said combination storage and sorting device includes
(b) means for adjustably mounting the said auxiliary cam trackway member on the upper surface of the said side wall member of the said combination storage and sorting drawer unit.

References Cited
UNITED STATES PATENTS

| | | | |
|---|---|---|---|
| 739,736 | 9/1903 | Speiser | 209—97 |
| 1,104,727 | 7/1914 | Bell | 209—97 |
| 1,905,791 | 4/1933 | Brown et al. | 209—97 |

ALLEN N. KNOWLES, *Primary Examiner.*